United States Patent

Inoue et al.

Patent Number: 5,868,638
Date of Patent: Feb. 9, 1999

[54] HYDRAULICALLY DAMPED TENSIONER DEVICE FOR POWER TRANSMISSION CHAIN

[75] Inventors: Kozo Inoue; Tomokazu Kaido, both of Saitama-ken, Japan

[73] Assignee: Tsubakimoto Chain Co., Osaka, Japan

[21] Appl. No.: 746,000

[22] Filed: Nov. 12, 1996

[30] Foreign Application Priority Data

Nov. 10, 1995 [JP] Japan ................................ 7-293150

[51] Int. Cl.⁶ ........................................................ F16H 7/08
[52] U.S. Cl. ........................ 474/110; 474/140; 474/111; 474/101
[58] Field of Search .............................. 474/101, 109, 474/110, 111, 112, 140

[56] References Cited

U.S. PATENT DOCUMENTS

| | | | |
|---|---|---|---|
| 4,283,182 | 8/1981 | Kraft | 474/110 |
| 5,006,095 | 4/1991 | Suzuki | 474/111 |
| 5,030,169 | 7/1991 | Kiso et al. | 474/110 |
| 5,073,150 | 12/1991 | Shimaya | 474/110 |
| 5,184,983 | 2/1993 | Shimaya et al. | 474/111 |
| 5,248,282 | 9/1993 | Susuki | 474/110 |
| 5,366,417 | 11/1994 | Shimaya | 474/112 |
| 5,647,811 | 7/1997 | Mott | 474/111 X |

FOREIGN PATENT DOCUMENTS

| | | | |
|---|---|---|---|
| 4001304 | 7/1991 | Germany | 474/101 |
| 484128 | 5/1938 | United Kingdom | 474/111 |
| 2254671 | 10/1992 | United Kingdom . | |
| 2254904 | 10/1992 | United Kingdom . | |

Primary Examiner—Daniel P. Stodola
Assistant Examiner—Gregory J. Strimbu
Attorney, Agent, or Firm—Dann, Dorfman, Herrell and Skillman; Henry H. Skillman

[57] ABSTRACT

A tensioner device for a power transmission chain, which has a small number of components and hence is able to reduce the cost of manufacture and assembly, can be mounted or installed easily, and requires only a small space for installation thereof. The tensioner device consists of a tensioner lever (4) pivoted at one end thereof on a support shaft (3) disposed on a fixed member (2) and carries, on a surface thereof facing a chain (7), a shoe (8) slidably engageable with the chain (7). The opposite end of the tensioner lever (4) has formed therein a plunger receiving hole (9) having an opening (9A) facing in a direction opposite to the surface to which the shoe (8) is attached. A plunger (10) is slidably received in the plunger receiving hole (9) and is held in abutment with a stopper (17) disposed on the fixed member (2). The plunger (10) is urged in a forward direction projecting outwardly from the plunger receiving hole (9), and a unidirectional restriction device resists movement of the plunger (10) in the reverse direction.

8 Claims, 7 Drawing Sheets

HYDRAULICALLY DAMPED TENSIONER DEVICE FOR POWER TRANSMISSION CHAIN

FIELD OF THE INVENTION

The present invention relates to a tensioner device for applying a tension to a power transmission chain.

BACKGROUND OF THE INVENTION

Conventionally, a tensioner device used with a power transmission chain, such as a timing chain of an engine, includes, as shown here in FIG. 9, a tensioner lever c pivotally connected at one of its opposite ends to a support shaft b disposed on a fixed member a inside the engine, and a plunger retaining portion f provided on the other end of the tensioner lever c at an opposite side from a surface to which is attached a shoe e facing a chain d.

The plunger retaining portion f is urged toward the chain d by means of a plunger h projecting from a tensioner body g attached to the fixed member f. Thus, a predetermined tension is applied to the chain d via the shoe e attached to the tensioner lever c.

The tensioner body g is assembled with a compression coil spring i urging the plunger h in the extended or projecting direction, and a hydraulic damper mechanism composed of a restricted oil passage j and a check valve k for dampening an impact force applied from the tensioner lever c.

The conventional tensioner device of the foregoing construction has a problem that since the tensioner lever is constructed separately from the tensioner body, the number of components is large and, hence, an increased number of steps is required for the manufacturing and installing of each component, incurring an increase in the cost. In addition, since the tensioner lever and the tensioner body are composed of separate components, a large space must be provided for installation of the conventional tensioner device.

Furthermore, since an accurate positioning of the tensioner lever and the tensioner body is needed for installation of the conventional tensioner device, the manufacturing process for a mounting surface and the mounting work is complicated.

SUMMARY OF THE INVENTION

It is accordingly an object of the present invention to overcome the foregoing problems of the prior art and provide a tensioner device for a power transmission chain, which has a smaller number of components and hence is able to reduce the cost, can be mounted or installed easily, and requires only a small space for installation thereof.

To attain the foregoing object, a tensioner device, for a power transmission chain, of this invention is of the type including a tensioner lever having one end pivotally supported on a support shaft disposed on a fixed member, and a shoe slidably engageable with the chain and attached to a surface of the tensioner lever facing the chain. The tensioner device comprises: a plunger receiving hole formed in the other end of the tensioner lever and having an opening at a side opposite to the surface to which the shoe is attached; a plunger slidably inserted from the opening into the plunger receiving hole and urged by an urging member in a direction projecting from the opening; and a stopper disposed on the fixed member and held in abutment with a projecting end of the plunger.

It is preferable that the plunger have a hollow portion formed therein and opening at one end to an end face of the plunger opposite from the projecting end, the urging member be composed of a compression coil spring disposed in the hollow portion, the plunger receiving hole and the hollow portion jointly define therebetween a high pressure chamber, and the tensioner lever have an oil intake passage for introducing an oil into the high pressure chamber via a check valve.

In one preferred form, the oil intake passage communicates with an oil reservoir provided in the tensioner lever with its upper side open. In another preferred form, the oil intake passage communicates with an oil reservoir formed jointly by a groove formed longitudinally in the tensioner lever and a portion of the shoe so configured as to cover the groove, and the oil reservoir communicates with an oil replenishing passage formed in the support shaft and opening at one end to an outside surface of the support shaft. And in yet another preferred form, the oil intake passage communicates via an oil supply pipe with an oil passage formed in the support shaft and opening at one end to an outside surface of the support shaft.

In one embodiment of the invention, the plunger has ratchet teeth formed on a portion of an outer peripheral surface thereof along an axial direction of the plunger, and a ratchet pawl is disposed on a side of the plunger receiving hole and urged in a direction to mesh with the ratchet teeth to prevent the plunger from moving in a direction retracting into the plunger receiving hole.

According to the tensioner device provided according to the invention for the power transmission chain, the plunger is urged by the urging member in the direction projecting outwardly from the plunger receiving hole and has a projecting end held in abutment with the stopper disposed on the fixed member. With this arrangement, the tensioner lever receives a force tending to turn the tensioner lever about the support shaft, so that the shoe attached to the tensioner lever is forced against the chain to keep the chain under tension.

In the case where the oil intake passage, through which the oil is introduced via a check valve into a high pressure chamber defined jointly by and between the plunger receiving hole and the hollow portion of the plunger, is provided in the tensioner lever, the high pressure chamber is filled with the oil supplied therein from the oil intake passage via the check valve. When the shoe is subjected to an impact force applied thereto from the chain side, the tensioner lever is turned by the impact force in one direction about the support shaft, whereupon the plunger is forced into the plunger receiving hole, thereby increasing the pressure of oil in the high pressure chamber. As a consequence of this pressure rise, the check valve is closed and the oil is thereafter forced to leak out from the high pressure chamber through a portion other than the oil intake passage during that time the oil encounters a flow resistance by means of which the impact force is dampened.

In the case where the supply of oil to the oil intake passage is done by using an oil reservoir provided in the tensioner lever with its upper side open, the oil flowing down from an upper portion is automatically stored in the oil reservoir. Thus the oil reservoir is automatically replenished.

In the case where the supply of oil to the oil intake passage is done with the use of an oil reservoir formed jointly by and between a groove formed longitudinally in the tensioner lever and a portion of the shoe so configured as to cover the groove, the oil reservoir is replenished with oil supplied via an oil replenishing passage formed in the support shaft and opening at one end to the outside surface of the support shaft. As an alternative, the oil intake passage may be connected with an oil passage formed in the support shaft by an oil supply pipe so that the oil is supplied from the oil passage to the oil intake passage.

In the case where the plunger is prevented from moving in a direction retracting into the plunger receiving hole by means of meshing engagement between ratchet teeth on the plunger and a ratchet pawl, movement of the tensioner arm in a direction away from the chain is prevented with the result that vibrations of the chain can be avoided.

BRIEF DESCRIPTION OF THE DRAWINGS

All of the objects of the present invention are more fully set forth hereinafter with reference to the accompanying drawings, wherein.

DETAILED DESCRIPTION OF THE PREFERRED EMBODIMENTS

Figure 1:
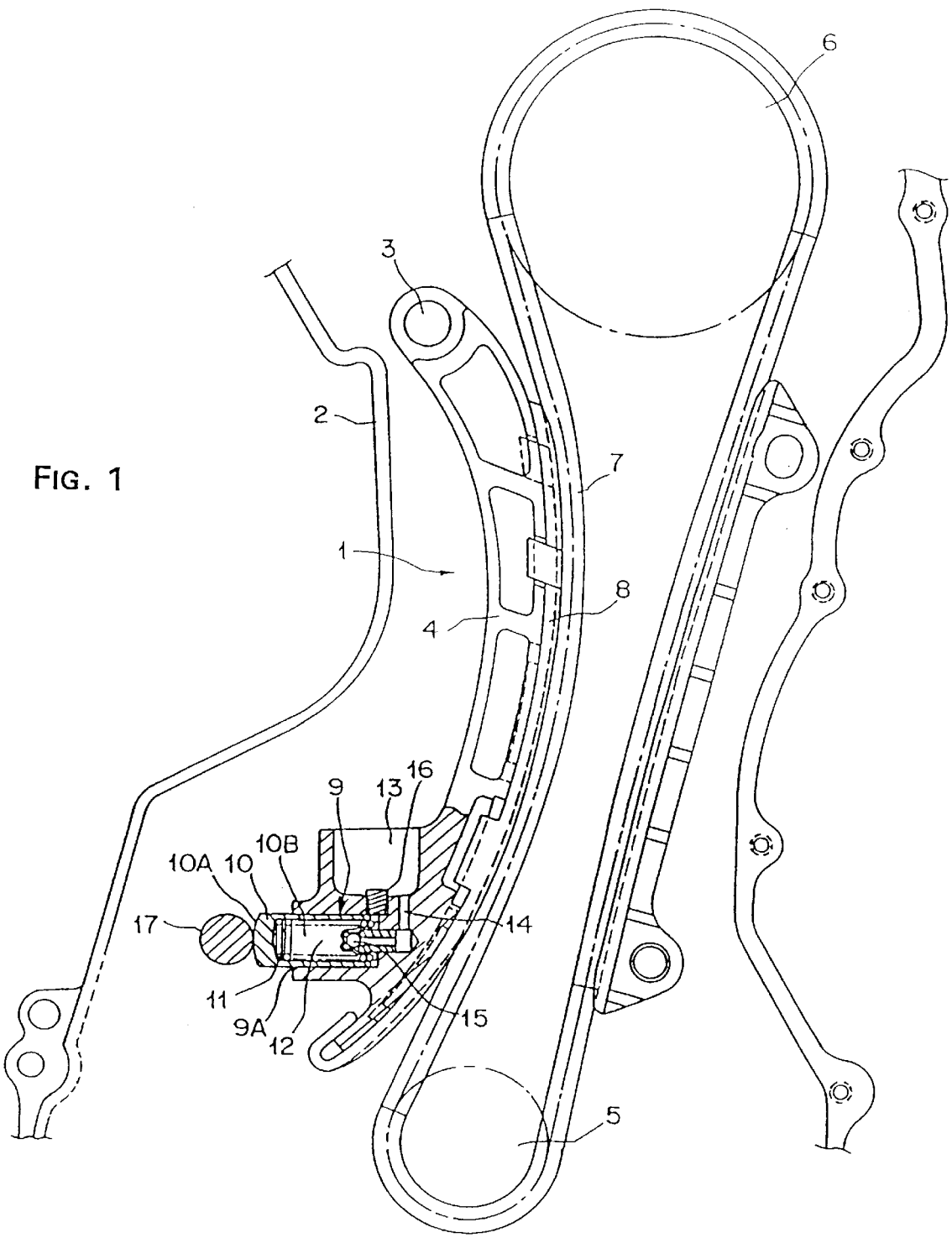
FIG. 1 is a view showing a first embodiment of a tensioner device according to the present invention.

Certain preferred embodiments of the present invention will be described below with reference to the drawings. A first embodiment of a tensioner device according to the present invention is shown in FIG. 1. The tensioner device 1 includes a tensioner lever 4 having one end pivotally supported by a support shaft 3 on a fixed member 2 disposed inside an engine. The tensioner lever 4 has a surface held in confrontation with a chain 7 spanning between a sprocket 5 on a crankshaft side and a sprocket 6 on a camshaft side, and a shoe 8 attached to this surface of the tensioner lever 4 for sliding engagement with the chain 7.

The other end of the tensioner lever 4 has a plunger receiving hole 9 formed therein at an opposite side from the surface to which the shoe 8 is attached. The plunger receiving hole 9 has an opening 9A, and a plunger 10 is slidably received in the plunger receiving hole 9 with its end portion 10A projecting from the opening 9A.

The plunger 10 has an internal hollow portion or space 10B open at one end of the plunger 10 which is remote from the projecting end 10A which is partly projecting from the opening 9A. The hollow portion 10B receives therein a compression coil spring 11 serving as an urging member for urging the plunger 10 in a direction projecting from the opening 9A. The hollow portion 10B and the plunger receiving hole 9 jointly define therebetween a space forming a high pressure chamber 12.

Formed above the plunger receiving hole 9 is an oil reservoir 13 open at its upper side. The oil reservoir 13 communicates with the high pressure chamber 12 via an oil intake passage 14 formed in the tensioner lever 4. A check valve 15 is disposed between the oil intake passage 14 and the high pressure chamber 12 so as to prevent an oil from flowing from the high pressure chamber 12 back into the oil intake passage 14. A spiral orifice 16 is provided between the high pressure chamber 12 and the oil reservoir 13, providing a restricted passageway for permitting the oil to leak out from the high pressure chamber 12 to the oil reservoir 13.

The fixed member 2 disposed inside the engine is provided with a stopper 17 to prevent movement of the plunger 10. To this end, the stopper 17 is held in abutment with the projecting end 10A of the plunger 10 which is urged by the compression coil spring 11 in the direction projecting from the opening 9A. The projecting end 10A is configured so as to have a spherical surface to avoid unstable contact with the stopper 17.

The stopper 17 limits one end position of the projecting end 10A of the plunger 10. Thus, the force of the compression coil spring 11 acts to turn the tensioner lever 4 about the support shaft 3 in a direction toward the chain 7 to keep the shoe 8 in pressure contact with the chain 7.

With the construction described above, the oil held or stored in the oil reservoir 13 flows into the high pressure chamber 12 via the oil intake passage 14 and the check valve 15 and the high pressure chamber 12 is filled with the oil. When an impact force is applied to the shoe 8 from the chain 7 while in operation, the tensioner lever 4 is subjected to a force tending to turn the tensioner lever 4 about the support shaft 3 in the clockwise direction in FIG. 1.

Consequently, the plunger 10, while being locked in position against movement in the projecting direction by virtue of abutting engagement with the stopper 17, is forced into the plunger receiving hole 9, thereby increasing the pressure of oil in the high pressure chamber 12. With this pressure rise, the check valve 15 is closed and the oil in the high pressure chamber 12 is thereafter forced to leak out from the high pressure chamber 12 through the restricted passageway in the spiral orifice 16 into the oil reservoir 13. The oil as it flows through the spiral orifice 16 encounters flow resistance by means of which the impact force is dampened or absorbed.

Since the oil reservoir 13 opens upwardly, the oil flowing down from an upper position within the engine is automatically received in the oil reservoir 13 so that the oil reservoir 13 is always filled or replenished with the oil.

Figure 2:
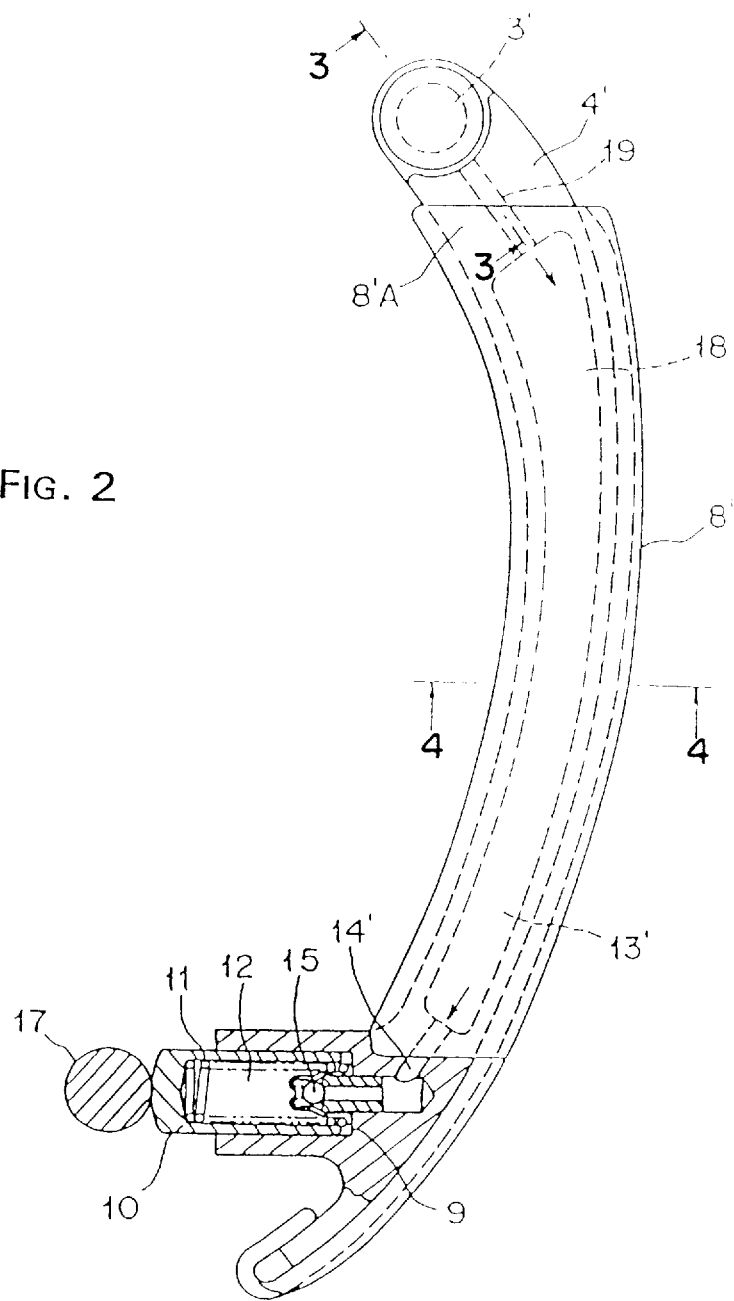
FIG. 2 is a view showing a second embodiment of the tensioner device according to the present invention;.
Figure 3:
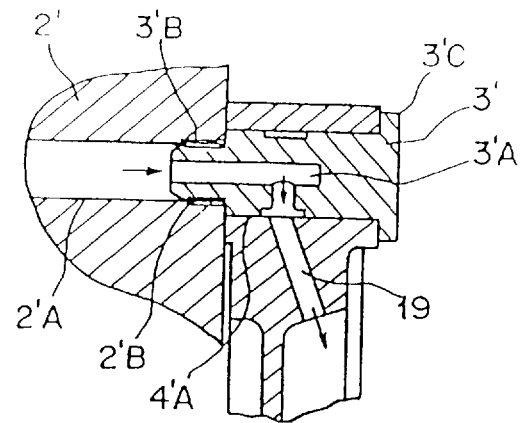
FIG. 3 is a cross-sectional view taken along line 3—3 of FIG. 2.
Figure 4:
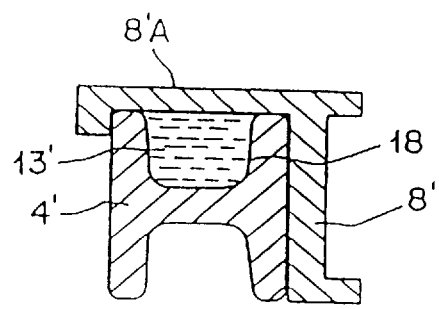
FIG. 4 is a cross-sectional view taken along line 4—4 of FIG. 2.

FIGS. 2–4 show a second embodiment of the tensioner device according to the present invention. In these figures, parts which are designated by the same reference characters as FIG. 1, have the same construction as those described above with respect to the first embodiment.

As shown in FIGS. 2–4, a tensioner lever 4' has a groove 18 extending longitudinally in one side surface thereof. The groove 18 is covered or closed by a cover portion 8'A formed integrally with a shoe 8' so that the groove 18 and the cover portion 8'A define therebetween a space forming an oil reservoir 13'. The oil reservoir 13' communicates with a high pressure chamber 12 of the same construction as the first embodiment via a check valve 15 and an oil intake passage 14' opening at one end to the groove 18.

A support shaft 3' pivotally supporting thereon the tensioner lever 4' has an external thread 3'B formed on the outside surface of an end portion thereof. The external thread 3'B is threaded with an internal thread 2'B formed in an open end portion of an attachment hole 2'A formed in the fixed member 2'. The opposite end portion of the support shaft 3' has a flange 3'C which serves to prevent the tensioner lever 4' from being displaced off the support shaft 3'. The support shaft 3' has an internal oil replenishing passage 3'A opening at one end to the outside surface of the support shaft 3'. The opposite end of the oil replenishing passage 3'A opens to an end face of the support shaft 3' received in the attachment hole 2'A. The attachment hole 2'A is used as an oil passage and held in fluid communication with a hydraulic power source, not shown.

The tensioner lever 4' has a bearing hole 4'A to which one end of an oil passage 19 opens for flow communication with the oil replenishing passage 3'A in the support shaft 3'. The opposite end of the oil passage 19 opens to the groove 18 so that the oil can flow into the oil reservoir 13 from the outside successively through the oil replenishing passage 3'A and the oil passage 19.

The oil stored in the oil reservoir 13 partly flows into the high pressure chamber 12 successively through the oil intake passage 14' and the check valve 15 so that the high pressure chamber 12 is always filled with the oil. When an impact force is applied from the chain side to the tensioner lever 4', the plunger 10 is forced into the plunger receiving hole 9 whereupon the check valve 15 is closed, and subsequently the oil in the high pressure chamber 12 is forced to leak out from the high pressure chamber 12 through a small gap or clearance between the plunger 10 and the plunger receiving hole 9. During that time, the oil encounters a flow resistance by means of which the impact force is dampened.

Figure 5:
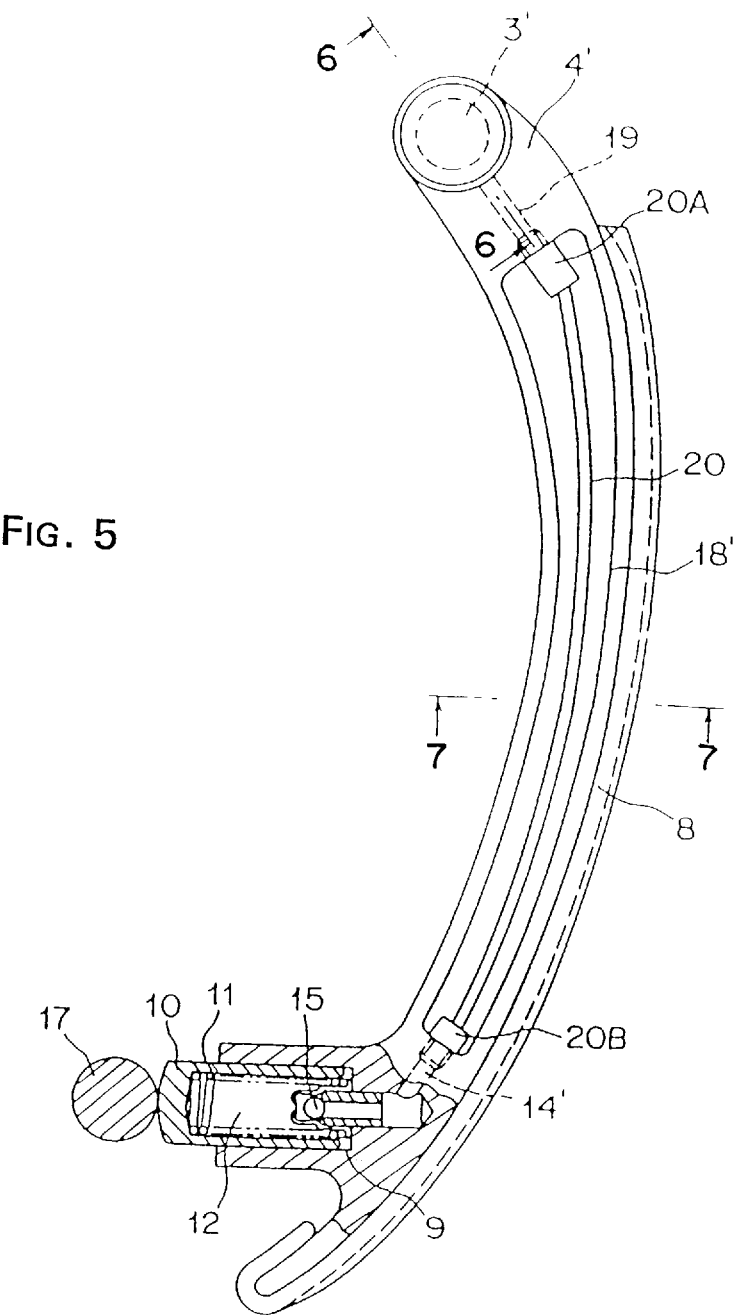
FIG. 5 is a view showing a third embodiment of the tensioner device according to the present invention.
Figure 6:
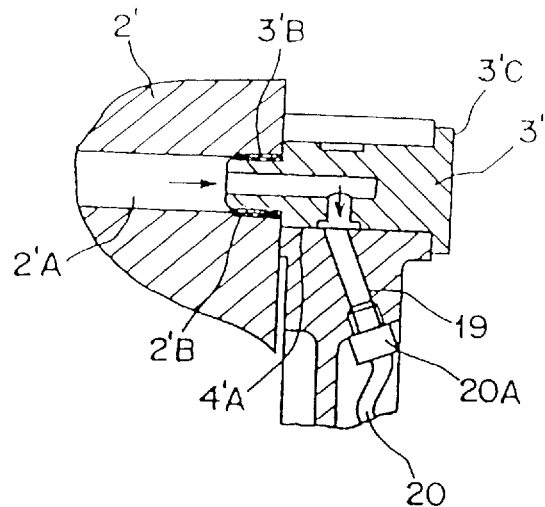
FIG. 6 is a cross-sectional view taken along line 6—6 of FIG. 5.
Figure 7:
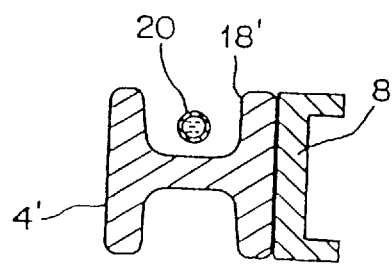
FIG. 7 is a cross-sectional view taken along line 7—7 of FIG. 5.

FIGS. 5–7 illustrate a third embodiment of the tensioner device according to the present invention, wherein the parts which are designated by the same reference characters as FIGS. 2–4 have the same construction as those described above with respect to the second embodiment.

According to this embodiment, the internal space of a groove 18' is not used as an oil reservoir but receives therein an oil supply pipe 20 directly interconnecting the oil passage 19 and the oil intake passage 14'. The oil supply pipe 20 is made of a flexible material and hence is bendable to conform to a curve of the tensioner arm 4'. The oil supply pipe 20 has opposite ends fitted with a pair of connectors 20A and 20B each having an external thread formed on the outside surface thereof. The respective external threads of the connectors 20A, 20B are threaded into an internal thread of an end portion of the oil passage 19 and an internal thread of an end portion of the oil intake passage 14', respectively, to attach the connectors 20A, 20B to the passages 19, 14'. In this embodiment, the shoe 8 is the same as one used in the first embodiment because the groove 18' may be left open.

The oil supply pipe 20 in this embodiment is disposed in the groove 18', however, it may be disposed outside the tensioner arm in which instance the oil passage 19 and the oil intake passage 14' are so formed as to open at their one end to an outside surface of the tensioner arm 4'. Furthermore, in the case where the tensioner arm is devoid of a groove, oil supply pipe may be disposed on and along a surface which is opposite to the surface on which the shoe 8 is provided.

Figure 8:
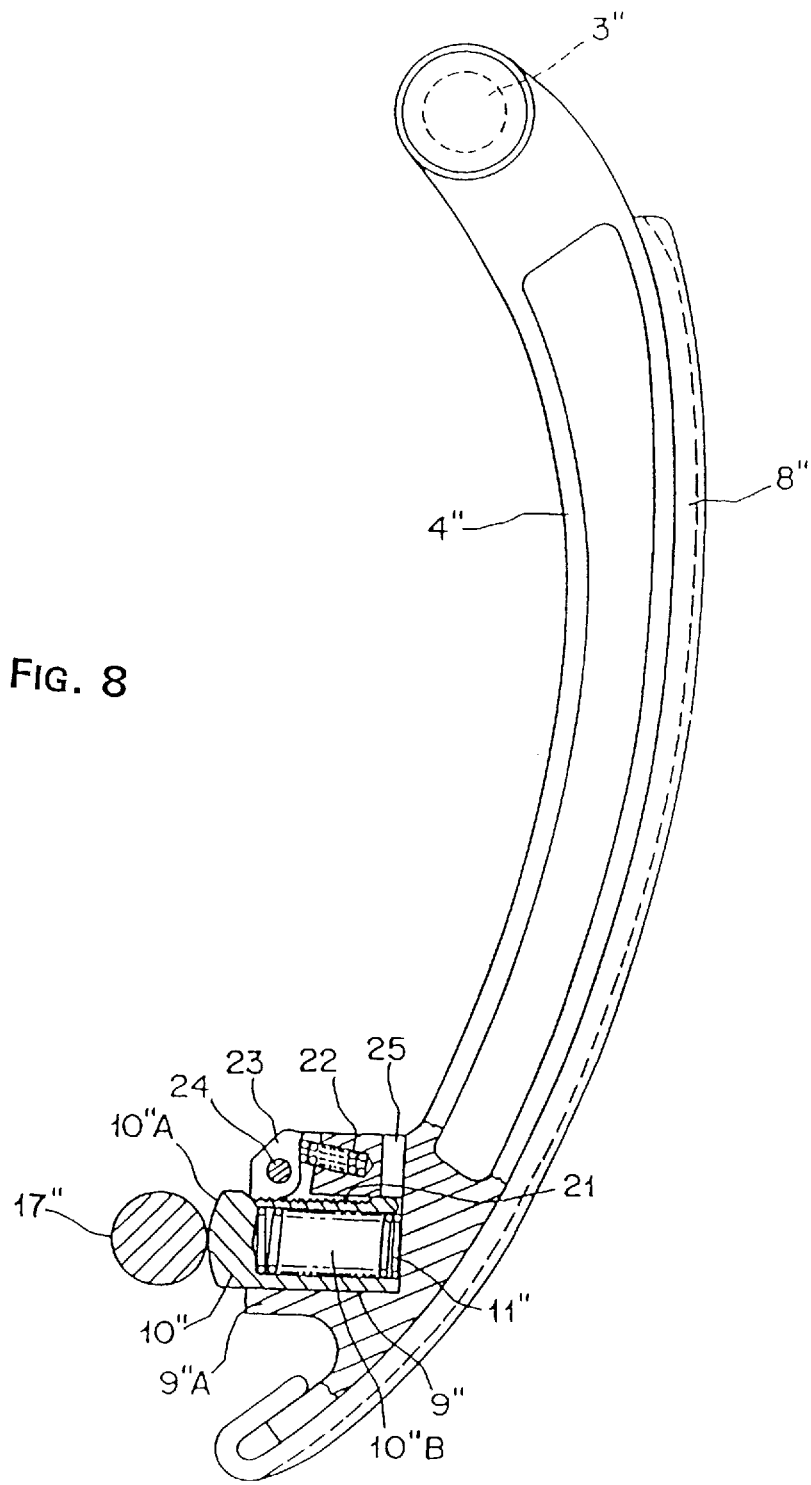
FIG. 8 is a view showing a fourth embodiment of the tensioner device according to the present invention.
Figure 9:
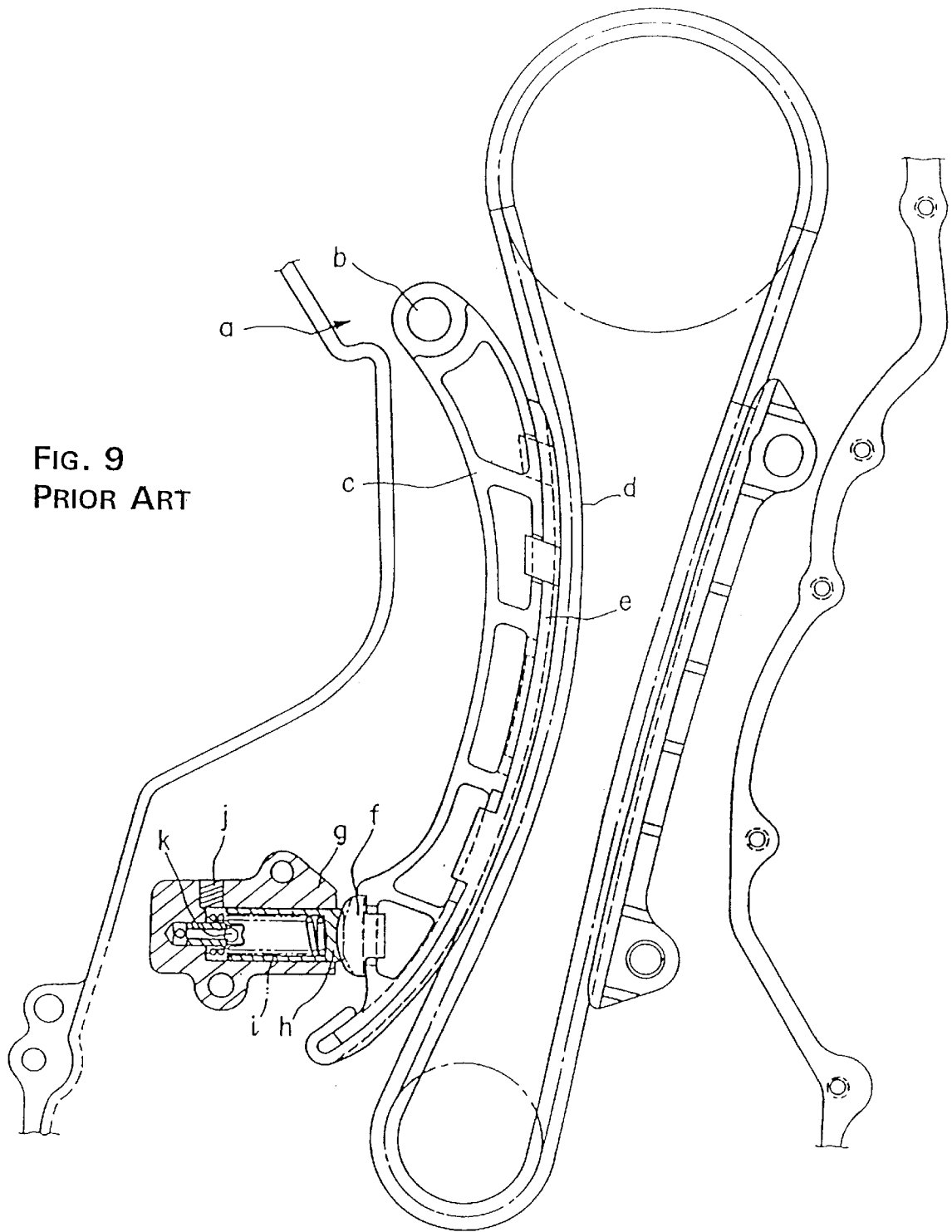
FIG. 9 is a view showing one example of a conventional tensioner device.

FIG. 8 illustrates a fourth embodiment of the tensioner device according to the present invention, in which a tensioner arm 4" has one end pivotally supported by a support shaft 3" on a fixed member, not shown, in the same manner as the embodiments previously described. The other end of the tensioner arm 4" has a plunger receiving hole 9" formed in a surface opposite to a surface on which a shoe 8" is provided. A plunger 10" is slidably received in the plunger receiving hole 9" with its projecting end 10"A held in abutment with a stopper 17" disposed on the non-illustrated fixed member.

The plunger 10" is urged in a direction projecting from the plunger receiving hole 9" by means of a compression coil spring 11" disposed in an internal hollow portion or space 10"B in the plunger 10" so that a reaction force is applied from the stopper 17" to the projecting end 10"A to force the shoe 8" against a chain, not shown, thereby exerting a predetermined tension on the chain.

The plunger 10" has, on its outside surface, a series of ratchet teeth 21 arranged in the axial direction of the plunger 10". At a side of the plunger receiving hole 91" which is laterally opposite to the ratchet teeth 21, there is provided a ratchet pawl 23 pivotally supported by a ratchet shaft 24 on the tensioner arm 4" and urged by a compression coil spring 22 in a direction to mesh with the ratchet teeth 21.

In the construction described above, when the plunger 10" is subjected to a force tending to move the plunger 10" in a direction projecting outwardly from the plunger receiving hole 9", the ratchet teeth 21 are freely movable together with the plunger 10" while the ratchet pawl 23 is forced to turn in the clockwise direction in FIG. 8 about the ratchet shaft 24 against the force of the compression coil spring 22. On the other hand, when the plunger 10" is subjected to a force tending to retract the plunger 10" into the plunger receiving hole 9", the ratchet pawl 23 turns in the counterclockwise direction in FIG. 8 about the ratchet shaft 24 by the force of the compression coil spring 22 and is thereby brought into meshing engagement with the ratchet teeth 21 to lock the plunger 101" in position against movement in the retracting direction.

Consequently, in the case where the chain becomes loose due to wear, the plunger 10" is forced to further project from the open end 9"A of the plunger receiving hole 91" by the force of the compression coil spring 11 whereby the tensioner arm 4" pivots about the support shaft 3" toward the chain to force the shoe 8" against the chain to hold the chain under proper tension. During that time, the ratchet pawl 23 permits the ratchet teeth 21 to pass freely past the ratchet pawl 23.

When an impact force is applied from the chain side to the shoe 81", the tensioner arm 4" is subjected to a force tending to separate the tensioner arm 4" away from the chain. As a consequence, the projecting end 10" of the plunger 10A receives from the stopper 17" a reaction force tending to retract the plunger 10" into the plunger receiving hole 9". In this instance, however, since the ratchet pawl 23 is held in mesh with the ratchet teeth 21 on the plunger 10" to keep the plunger 10" in position against movement in the retracting direction, the aforesaid pivotal movement of the tensioner arm 4" (in the direction away from the chain) does not take place and, accordingly, vibration of the chain can be avoided.

The tensioner arm 4" has an oil hole 25 allowing the plunger receiving hole 9" to communicate with the outside of the tensioner arm 4" to facilitate smooth sliding movement of the plunger 10" in the plunger receiving hole 9" and smooth operation of the ratchet pawl 23. The oil hole 25 has an open end located directly beneath the support shaft 3" so that the oil falling by gravity down from an upper portion is received in the oil hole 25 and thence in the plunger receiving hole 9".

In the embodiments described above, the tensioner device of this invention is used with the run of a chain spanning between a sprocket on the crankshaft side and a sprocket on the camshaft side. The application of this tensioner device should by no means be limited to the illustrated embodiment but may include an application in which the tensioner device is used with a power transmission chain for an apparatus other than the engine. Also in the foregoing embodiments, the projecting end of the plunger has a spherical surface, and the stopper has a cylindrical shape. However, the projecting end of the plunger may have a flat end face, while the stopper may have a spherical shape. The stopper may be formed integrally with the fixed member.

As described above, according to the present invention, a plunger by which a shoe attached to a tensioner arm is forced against a chain is built or assembled in the tensioner arm. With this arrangement, it is possible to omit a tensioner body which is attached, as a separate component structurally independent from the tensioner arm, to the fixed member of a conventional tensioner device. The number of components is thus reduced and accordingly the number of steps required for the making and installing of the components can be reduced, bringing about a reduction in the cost of the tensioner device.

In addition, the fixed member has no need of any component except the stopper. This is particularly advantageous when the tensioner device is used as a tensioner device for a timing chain of an engine because the number of manufacturing steps required for providing an attachment surface on the fixed member of the engine side can be reduced. Accordingly, the tensioner device can be mounted or installed easily and requires a small space for installation thereof.

In the illustrated embodiments, the device has a unidirectional restriction device to resist reverse movement of the plunger inwardly of the plunger receiving hole. In the case where the tensioner lever has an oil intake passage for introducing the oil via the check valve into the high pressure chamber defined by and between the plunger receiving hole and the hollow portion of the plunger, an impact force applied from the chain side to the shoe can be dampened by a flow resistance generated when the oil is forced out from the high pressure chamber through a restricted passageway by passing the check valve.

Particularly in the case where the oil supply to the oil intake passage is done from an oil reservoir provided in the tensioner lever open at its upper end, the oil flowing by gravity down from an upper portion moves into the oil reservoir. Thus, the oil reservoir is automatically replenished with the oil. In the case where the oil intake passage communicates with an oil reservoir defined jointly by a groove formed longitudinally in the tensioner lever and a portion of the shoe so configured as to cover the groove, and where the oil reservoir communicates with an oil replenishing passage formed in a support shaft of the tensioner lever and opening at one end to the outside surface of the support shaft, the tensioner device is compact in size because the oil reservoir has no part projecting from the tensioner lever.

Furthermore, in the case where the oil intake passage and an oil passage formed in the support shaft are connected together by an oil supply pipe for supply an oil from the oil passage to the oil intake passage, the oil can be readily supplied from the outside of the tensioner arm to the oil intake passage regardless of the structure of the tensioner arm.

In the case where the unidirectional restriction device comprises a ratchet pawl meshed with ratchet teeth on the plunger to prevent the plunger from moving in a direction retracting into the plunger receiving hole, the tensioner arm is prevented from moving in a direction away from the chain with the result that the chain, while running, is prevented from causing vibration.

While particular embodiments of the invention have been herein illustrated and described, it is not intended to limit the invention to such disclosures, but changes and modifications may be made therein and thereto within the scope of the following claims.

We claim:

1. A tensioner device for a power transmission chain adapted to travel past said tensioner device, comprising:

a fixed pivot having an oil-replenishing passage;

a tensioner lever having a longitudinal groove therein, an upper end pivotally supported on said fixed pivot, and a lower end;

a shoe attached to said tensioner lever, said attached shoe adapted to be slidably engaged with the chain and having a portion overlying said groove;

a plunger receiving hole formed in said lower end of said tensioner lever, and having an opening facing away from said attached shoe;

a plunger slidably engaged in said hole and having a projecting end;

an urging member urging said plunger in an advancing direction outwardly from said hole through said opening;

a fixed stopper abutting the projecting end of said plunger to arrest advancing movement of said plunger relative to said fixed pivot; and an oil reservoir formed jointly by said longitudinal groove and said overlying portion of said attached shoe, said oil reservoir communicating at one end with said oil-replenishing passage and communicating at another end with said plunger receiving hole;

said plunger defining a high pressure chamber between said plunger and said tensioner lever; and a check valve for introducing oil from said reservoir into said chamber.

2. A tensioner device according to claim 1, wherein said plunger has a hollow portion formed therein, said hollow portion being open at an end of said plunger opposite from said projecting end, said urging member comprising a compression coil spring disposed in said hollow portion.

3. A tensioner device according to claim 2, wherein said check valve has an oil intake passage communicating with said oil reservoir.

4. A tensioner device according to claim 2, wherein said tensioner lever has an oil supply pipe connected to said oil-replenishing passage, wherein said check valve has an oil intake passage communicating with said oil-replenishing passage.

5. A tensioner device according to claim 1, wherein said plunger has an outer peripheral surface having ratchet teeth formed therein along a length of said plunger, said tensioner device having a ratchet pawl disposed adjacent said plunger receiving hole and urged in a direction to mesh with said ratchet teeth to prevent said plunger from retracting into said plunger receiving hole.

6. A tensioner device according to claim 1 including a unidirectional restriction device resisting retracting movement of said plunger into said plunger receiving hole.

7. A tensioner device according to claim 6 wherein said restriction device comprises said check valve, a restricted passageway bypassing said check valve, and said oil reservoir, said restriction device supplying oil through said check valve to allow movement of said plunger under a urging by said urging member in said advancing direction, and to allow said oil reservoir to receive oil from the high pressure chamber through said restricted passageway to resist the retracting movement of said plunger and compression of said urging member.

8. A tensioner device according to claim 6 wherein said restriction device comprises a pawl and ratchet assembly allowing movement of said plunger in said advancing direction by said urging member and preventing retracting movement of said plunger.

* * * * *

UNITED STATES PATENT AND TRADEMARK OFFICE
CERTIFICATE OF CORRECTION

PATENT NO. : 5,868,638

DATED : February 9, 1999

INVENTOR : Kozo INOUE et al.

It is certified that errors appear in the above-identified patent and that said Letters Patent is hereby corrected as shown below:

Column 6, line 10, change "91" to --9--;

line 28, change "101" to --10--;

line 32, change "91" to --9--;

line 41, change "81" to --8--;

Signed and Sealed this

Twenty-ninth Day of June, 1999

Attest:

Q. TODD DICKINSON

*Attesting Officer*     Acting Commissioner of Patents and Trademarks